(12) United States Patent
Sangeeta et al.

(10) Patent No.: US 6,294,261 B1
(45) Date of Patent: Sep. 25, 2001

(54) METHOD FOR SMOOTHING THE SURFACE OF A PROTECTIVE COATING

(75) Inventors: D. Sangeeta, Cincinnati, OH (US); Curtis Alan Johnson, Schenectady; Warren Arthur Nelson, Clifton Park, both of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/409,878

(22) Filed: Oct. 1, 1999

(51) Int. Cl.[7] .................................................. B32B 9/00
(52) U.S. Cl. .................... 428/469; 428/472; 428/472.2; 428/702; 416/241 R; 416/241 B
(58) Field of Search ........................... 428/141, 142, 428/469, 472, 472.2, 702; 416/241 R, 241 B (56) References Cited

U.S. PATENT DOCUMENTS

| | | |
|---|---|---|
| 5,047,612 | 9/1991 | Savkar et al. . |
| 5,332,598 | 7/1994 | Kawasaki et al. . |
| 5,366,765 * | 11/1994 | Milaniak et al. ................. 427/229 |
| 5,514,482 * | 5/1996 | Strangman ........................ 428/623 |
| 5,759,932 | 6/1998 | Sangeeta et al. . |
| 5,807,428 * | 9/1998 | Bose et al. .................... 106/14.44 |
| 5,834,070 * | 11/1998 | Movchan et al. ................. 427/566 |
| 5,900,283 * | 5/1999 | Vakil et al. ....................... 427/453 |

* cited by examiner

Primary Examiner—Deborah Jones
Assistant Examiner—Bryant Young
(74) Attorney, Agent, or Firm—Noreen C. Johnson; Douglas E. Stoner (57) ABSTRACT

A method for smoothing the surface of a ceramic-based protective coating which exhibits roughness is disclosed. The method includes the steps of applying a ceramic-based slurry or gel coating to the protective coating surface; heating the slurry/gel coating to remove volatile material; and then further heating the slurry/gel coating to cure the coating and bond it to the underlying protective coating. The slurry/gel coating is often based on yttria-stabilized zirconia, and precursors of an oxide matrix. Related articles of manufacture are also described.

16 Claims, 1 Drawing Sheet

METHOD FOR SMOOTHING THE SURFACE OF A PROTECTIVE COATING

This invention was made with government support under Contract No. DEFC21-95-MC311176 awarded by DoE. The government may have certain rights to the invention.

BACKGROUND OF THE INVENTION

The general field of the present disclosure relates to protective coatings applied to metals. More specifically, the invention is directed to methods for smoothing the surfaces of such coatings.

Thermal barrier coatings (TBC's) are often used to improve the efficiency and performance of metal parts which are exposed to high temperatures. Aircraft engines and land-based turbines are made from such parts. The combustion gas temperatures present in turbines are maintained as high as possible for operating efficiency. Turbine blades and other elements of the engine are usually made of alloys which can resist the high temperature environment, e.g., superalloys, which have an operating temperature limit of about 1000° C.–1150° C. Operation above these temperatures may cause the various turbine elements to fail and damage the engine.

The thermal barrier coatings effectively increase the operating temperature of the turbine by maintaining or reducing the surface temperature of the alloys used to form the various engine components. Most thermal barrier coatings are ceramic-based, e.g., based on a material like zirconia (zirconium oxide), which is usually chemically stabilized with another material such as yttria. For a turbine, the coatings are applied to various surfaces, such as turbine blades and vanes, combustor liners, and combustor nozzles. Usually, the thermal barrier coating ceramics are applied to an intervening, metallic bond layer which has been applied directly to the surface of the metal part.

The thermal barrier coatings are often applied to the part by a thermal spray technique, such as a plasma spray process. In this technique, an electric arc is typically used to heat various gasses, such as air, oxygen, nitrogen, argon, helium, or hydrogen, to temperatures of about 8000° C. or greater. (When the process is carried out in an air environment, it is often referred to as air plasma spray or "APS".) The gasses are expelled from an annulus at high velocity, creating a characteristic thermal plume. Powder material (e.g., the zirconia-based composition) is fed into the plume, and the particles are melted and accelerated toward the substrate being coated. For some applications, plasma-spray techniques have numerous advantages over other coating techniques, such as electron beam physical vapor deposition (EB-PVD). As an example, plasma spray systems are usually less costly than EB-PVD. Moreover, they are well suited for coating large, complex-shaped parts, with good control over the thickness and uniformity of the coatings.

While plasma-spraying is often the best technique for applying thermal barrier coatings, use of the process can present some problems under various circumstances. For example, a plasma-sprayed coating often has a relatively rough surface, e.g., an "Ra" (center-line average roughness) value greater than about 8 microns. Much smoother surfaces are required when the coating is to be applied to turbine components like airfoils, so that the convective component of the heat flux delivered to the coating can be reduced. Moreover, a smooth surface can also reduce aerodynamic drag losses.

A number of techniques can be used to smooth the surface of coatings like TBC's. Examples include grinding, tumbling, heavy-sanding, and heavy-polishing operations. In some situations, these techniques are quite effective. However, they can also be very time-consuming (especially with large, complex-shaped parts), adding considerably to the overall cost of fabrication. Moreover, they can sometimes mechanically damage the thermal barrier coating. For example, a sand-tumbling operation can sometimes result in the preferential smoothing/wearing of certain areas of the coating. The decreased thickness in those areas can undesirably lower the thermal resistance of the thermal barrier coating. Moreover, grinding and some of the other operations can sometimes result in the formation of pits, due to the "pull-out" of local portions of the coating material.

Polishing operations can often be effective for smoothing a protective coating surface, and will not have as much of a tendency to damage the surface, as in the case of some of the other operations. However, heavy-polishing (which might be considered as "grinding") can still result in the unequal smoothing or wearing of the coating surface. Moreover, the polishing of certain types of coatings, such as air plasma-applied zirconia-based TBC's, can still result in pits (i.e., from pull-out) in the surface. Furthermore, large cracks are sometimes formed in relatively thick coatings deposited by plasma spray techniques. It is often not possible to remove these types of cracks by the heavy polishing operations. The pits and large, deposition-related cracks are often unacceptable features on the surface, because they increase the hot gas turbulence, causing increased heat transfer and reduced thermal protection of the base metal.

It should therefore be apparent that new methods for smoothing the surface of a protective coating like a TBC would be welcome in the art. The methods should smooth the surface to a degree suitable for aerodynamic applications, while maintaining all of the beneficial characteristics of the protective coating. It would sometimes be desirable if the methods also assisted in controlling the thickness of the protective coatings. Moreover, the methods should be fully compatible with the application of the thermal barrier coating over a substrate, and should not add excessive cost or time to the overall production operation.

SUMMARY OF THE INVENTION

In response to the needs of the prior art, a new method for smoothing the surface of a ceramic-based protective coating which exhibits roughness has been discovered. The method comprises the steps of:

(a) applying at least one ceramic-based slurry or gel coating over the surface of the protective coating;

(b) heating the slurry/gel coating under temperature and time conditions sufficient to remove substantially all volatile material from the slurry/gel coating; and then (c) further heating the slurry/gel coating under temperature and time conditions sufficient to cure the slurry/gel coating and bond it to the protective coating. (The term "slurry/gel " coating is explained below).

The coating applied over the protective coating is often a slurry which includes a refractory filler like zirconia (e.g., yttria-stabilized zirconia). The coating composition further includes chemical precursors which are transformed into an oxide matrix after the coating is cured. Preferred oxide matrixes prepared from precursors for this invention are alumina, aluminosilicate, calcium oxide, and magnesium oxide.

In some preferred embodiments, the slurry/gel coating is applied in a number of layers. For example, a slurry base composition which may contain varying amounts of the refractory filler (e.g., 0% to about 50% zirconia spheres) and the oxide matrix precursors is first applied over the protective coating, followed by removal of volatile materials from the base composition. Then, one or more slurry topcoats which contain the matrix precursors can be applied on top of the base layer, wherein at least one of the topcoats includes the refractory filler.

Each topcoat is usually heat-treated after being applied to remove all or most of the volatile material contained therein. In some preferred embodiments, a "finish-coat", which is usually similar to the base composition, is applied over the last topcoat. The final coating system, sometimes referred to herein as an "overcoat", is then heat-treated at temperatures sufficient to cure the overcoat and bond it securely to the underlying protective coating.

In many preferred embodiments, the slurry/gel-derived coating is further smoothened after being cured, by fine-grinding or polishing. Polishing or fine-grinding could also be carried out after the application of one or more of the topcoats, and/or after the deposition of the optional finish-coat (i.e., before and/or after curing).

The present invention may be used in various situations. For example, it may be used to smoothen a protective coating surface which is quite rough as applied, e.g., an air-plasma sprayed TBC. It may also be used to fill in cracks and pits (or any type of depression or valley) which are sometimes formed in protective coating surfaces. Regardless of the particular application, the end result of the present process is a protective coating which usually has surface roughness (Ra) of less than about 7 microns, and preferably, less than about 3 microns.

The relatively smooth surface beneficially reduces the amount of heat transfer into a coating like a TBC, thereby allowing the coating to be used in a higher-temperature environment. The modified surface also reduces aerodynamic losses. In the case of substrates which are part of turbines, the aerodynamic enhancement results in higher turbine efficiency.

The process of this invention can also be used to provide better control over the thickness of the protective coating. For example the use of conventional grinding operations which may uncontrollably "wear down" the coating and decrease its thickness can be eliminated or minimized by the present invention.

As described below, another embodiment of the present invention is directed to an article, which comprises:

(I) a metal-based substrate, such as a superalloy;

(II) a protective coating applied over the substrate, e.g., a zirconia-based TBC; and (III) a cured, ceramic-based slurry/gel overcoat over the surface of the protective coating.

Other details regarding the various embodiments of this invention are provided below.

DETAILED DESCRIPTION OF THE INVENTION

The presently-described process can be used to smoothen the surface of any ceramic-based protective coating. Very often, the coating is a thermal barrier coating, as discussed above. While many materials can be used for the thermal barrier coatings, they are often zirconia-based. The zirconia is usually chemically stabilized by being combined with a material such as yttrium oxide (yttria), calcium oxide, magnesium oxide, cerium oxide, scandium oxide, or mixtures of any of those materials. In one specific example, zirconia can be blended with about 1% by weight to about 20% by weight yttria (based on their combined weight), and preferably, from about 3%–10% yttria.

Thermal barrier coatings are often applied to a substrate by a plasma-spray technique. Plasma-spraying is well-known in the art, e.g., see the Kirk-Othmer *Encyclopedia of Chemical Technology*, 3rd Edition, V. 15, page 255, and references noted therein. U.S. Pat. Nos. 5,332,598; 5,047, 612 (Savkar and Lillquist); and U.S. Pat. No. 4,741,286 are instructive in regard to various aspects of plasma spraying (e.g., APS), and are incorporated herein by reference. (A high-temperature heat treatment or "firing" often follows deposition of the TBC.). As described previously, plasma-spraying of TBC's—especially air plasma spraying, results in a relatively rough surface texture. The as-sprayed roughness is often greater than about 8 microns, and sometimes, greater than about 12 microns.

The coating or "overcoat" which is utilized to smoothen the surface of the ceramic-based protective coating can be in the form of a slurry or gel. The meaning of each of these terms differs somewhat, depending on the literature source. In general, a slurry is a solid-particle suspension in liquid. A gel can generally be thought of as a substance that contains a continuous solid skeleton enclosing a continuous liquid phase, as described in *Sol-Gel Science*, by C. J. Brinker et al, Academic Press, Inc., 1990, the contents of which are incorporated herein by reference. (Some specific types of gels are sometimes referred to as colloids in which the phases have combined to produce a viscous, jelly-like product, as described in *The Condensed Chemical Dictionary*, 10th Edition, B. Hawley, Van Nostrand Reinhold Company Inc., 1981, which is also incorporated herein by reference). For simplicity, the coating is referred to hereinafter as a "slurry/gel" coating, unless one or the other term is dealt with individually. When the underlying protective coating is a TBC, the slurry/gel coating is preferably formed of a refractory material.

Various types of slurry coatings can be used for the present invention. Most of them include a refractory filler, such as zirconia, alumina, mullite, or magnesium oxide. Various zirconia-containing slurry coatings are described in U.S. Pat. No. 5,759,932 of D. Sangeeta et al, which is incorporated herein by reference. As used herein, "zirconia" is meant to also include blends with lesser amounts of other materials. In preferred embodiments, the zirconia is chemically stabilized, as described above in reference to zirconia-based protective coatings.

Various forms of the zirconia can be employed. In some embodiments, the zirconia is in the form of spheres, which are commercially available, e.g., from Sulzer-METCO, Inc. Methods for forming the spheres are also known in the art and described, for example, in U.S. Pat. No. 4,450,184, incorporated herein by reference, and in the above-mentioned U.S. Pat. No. 5,759,932. Usually, substantially all of the spheres have a size between about 5 microns and about 400 microns. Mixtures of hollow zirconia spheres and substantially solid zirconia spheres are possible. Sometimes, at least about 20% of the zirconia spheres are hollow.

When the slurry/gel coating is cured (as described below), the refractory filler, e.g., zirconia, will usually be contained within a porous oxide matrix. The character of the oxide matrix will depend on the precursors used to form the matrix. Suitable precursors are those which will permit the slurry to be easily applied to the exposed surface of the protective coating. The precursors should of course be compatible with the other slurry components. Moreover, they should result in a matrix which is capable of retaining the refractory filler (e.g., zirconia spheres or particles) in place, e.g., as a sort of glue, during curing, firing, and other processing operations. The matrix itself should have a melting point of at least about 850° C. for most applications of this invention. Sometimes, the melting point of the matrix should be at least about 1100° C. when the overcoat is to be used in more rigorous environments, e.g., as applied to a TBC which protects a turbine engine part.

Selection of the precursors of the oxide matrix (as well as other components in the slurry) is sometimes governed in part by the desire to have a thermal expansion coefficient for the cured and fired coating which is as close as possible to the thermal expansion coefficient of the protective coating. In general, the thermal expansion coefficient of the oxide matrix is often greater than about $2 \times 10^{-6}$ cm/cm ° C., and preferably greater than about $4 \times 10^{-6}$ cm/cm ° C. However, these values are not always critical. Often, the coefficient for the refractory filler, as well as the microstructure of the cured protective coating itself (e.g., its porosity), will compensate for the lower coefficient of the matrix.

The oxide which constitutes all or at least a portion of the oxide matrix is usually selected from the group consisting of aluminum oxide (alumina), aluminosilicate, calcium oxide, magnesium oxide, barium oxide, silicon dioxide (silica), titanium dioxide, zirconium dioxide, yttrium oxide, and compounds formed from mixtures of any of these materials. Preferred oxides within this group are alumina, aluminosilicate, calcium oxide, magnesium oxide, and mixtures of any of these oxides. All of these materials are commercially available, and precursors of the oxides are also well-known in the art.

It is sometimes desirable that the matrix-portion of the slurry constitute as small a proportion of the composition as possible, as long as a desirable cohesive strength for the fired coating is maintained. For example, in some embodiments, the matrix comprises no greater than about 50% by volume of the total coating volume.

In some especially preferred embodiments, the oxide is an aluminosilicate-type material. Such a material is found in nature, or can be obtained by various techniques. For example, one form of aluminosilicate is known as mullite, and it can be obtained by heating other aluminum silicates, such as cyanite and sillimanite. Other forms can be derived synthetically, e.g., by heating aluminum fluoride, silica, and water vapor at a high temperature. Often, the aluminosilicate used in the present invention is formed as part of the overall preparation of the slurry.

The silica used in aluminosilicates may be derived from a variety of sources. In some embodiments, free silica could be used. However, binder-type materials may have to be used in conjunction with the free silica, to ensure the appropriate rheology for the resultant slurry composition (e.g., the appropriate viscosity for slurry-spray or various other coating techniques).

In preferred embodiments, the silica is derived from a siloxane material. Non-limiting examples of suitable silica sources are polyalkylsiloxanes with a variety of terminating functional groups (e.g., hydroxy, amine, vinyl, alkoxy, halo, etc.), as well as various silicone emulsions. Silicone resins having a relatively high char yield are especially suitable, e.g., those which, when burned, yield at least about 65% silica, and preferably, at least about 80% silica. One commercial example of a suitable silicone resin is SR-350, available from General Electric Company. This material is a dry silicone binder with a silicon-oxygen backbone. It retains about 80% of its weight when heated to about 900° C. In general, the silicone resin also functions as a binding agent in the ceramic slurry composition.

When the cured oxide matrix comprises an aluminosilicate compound derived from alumina and silica, the molar ratio between the silica and alumina usually ranges from about 30:70 to about 45:55; and preferably ranges from about 35:65 to about 40:60. In practice, a particular ratio is selected according to various factors, such as the requirements for thermal expansion, thermal conductivity, and thermal stability (e.g., the melting point) of the protective coating. For some embodiments of this invention, the ratio is made as close as possible to the stoichiometry of mullite, $3Al_2O_3 \cdot 2SiO_2$.

Alternatively, the aluminosilicate or other forms of oxide-based matrices could be prepared by a sol-gel process. These types of processes are known in the art, and described in a variety of references. Further details are provided below, in the general discussion regarding the preparation and use of gels.

The slurry composition usually includes a liquid carrier. A variety of carriers may be used for this invention, as described, for example, in U.S. Pat. No. 5,759,932. Non-limiting examples include water, lower alcohols (i.e., 1–4 carbon atoms in the main chain) such as ethanol; halogenated hydrocarbon solvents such as tetrachloromethane; and compatible mixtures of any of these substances. Selection of a carrier used will depend on various factors (some of which were mentioned previously), such as: the evaporation rate required during subsequent processing; the effect of the carrier on the adhesion of the slurry coating to the protective coating; the solubility of additives and other components in the carrier; the "dispersibility" of powders in the carrier; the carrier's ability to wet the substrate to modify the rheology of the slurry composition; as well as handling requirements; cost; availability; and environmental/safety concerns. Those of ordinary skill in the art can select the most appropriate carrier by considering these factors.

Because of their usefulness in enhancing the "flowability" of the slurry and its adhesion to the protective coating surface, chlorinated solvents like tetrachloromethane are often preferred, assuming any environmental issues regarding these materials can be adequately resolved. In other instances, water or alcohols like ethanol and isopropanol are the preferred carriers.

The amount of liquid carrier employed is usually the minimum amount sufficient to keep the solid components of the slurry in suspension. Amounts greater than that level may be used to adjust the viscosity of the slurry composition, depending on the technique used to apply the composition to the protective coating. In general, the liquid carrier will constitute about 30% by weight to about 70% by weight of the entire slurry composition. Additional amounts of the liquid carrier may be used to adjust slurry viscosity prior to application of the coating.

A variety of other components may be used in the slurry coating composition. Most of them are well-known in areas of chemical processing and ceramics processing. As but one illustration, many are described in the Kirk-Othmer *Encyclopedia of Chemical Technology,* 4th Edition, Vol. 5, pp.

610–613. Examples include thickening agents, dispersants (which break up flocs in a slurry); deflocculants, anti-settling agents, binders, plasticizers, emollients, lubricants, surfactants and anti-foam agents. In general, lubricants, thickeners, or emollients may each be used at a level in the range of about 0.01% by weight to about 10% by weight, and more preferably, about 0.1% by weight to about 2.0% by weight, based on the weight of the entire slurry composition. Those skilled in the art can determine the most effective level for any of the other additives, without undue effort.

Slurry compositions used for the present invention can be prepared by a variety of techniques, as described in U.S. Pat. No. 5,759,932. For example, in the case in which the oxide matrix is based on silica and alumina, it is often desirable to initially mix the silica source with a portion of the liquid carrier. Often, an emollient such as one of the glycol-based materials is added to this premix. This technique is especially effective when the source of silica is a silicone resin. The premix is then mixed by conventional techniques, e.g., a paint mixer, ball mill, or via ultrasonic agitation, until the components appear to be homogeneously distributed. The mixing time is usually about 5 to about 30 minutes for a premix having a weight of about 0.1 kg to about 0.5 kg.

The oxide matrix-precursor materials and a portion of the refractory filler (e.g., the zirconia) are then added to the premix. Typically, about 0% to about 65% of the total amount of refractory filler to be used in the overcoat is added to this secondary mixture (sometimes referred to herein as "slurry A"). This amount can be adjusted, based on various factors, such as the time it takes for the refractory filler to become incorporated into the mixture. Afterward, the secondary mixture is thoroughly mixed. (When using zirconia spheres as the refractory filler, ultrasonic agitation is often preferred, because it reduces breakage of any hollow spheres.). Again, milling media is sometimes used during this step.

The secondary mixture, i.e., slurry A, is then combined with the remaining refractory filler and the remainder of the liquid carrier, along with any other additives being used. The resulting mixture, sometimes referred to herein as "slurry B", is thoroughly blended. Again, milling media and/or ultrasonic agitation is sometimes used.

It should thus be understood that in some preferred embodiments of this invention, the coating composition comprises two parts. The first part is slurry A, comprising a portion of a liquid carrier, a silica source, an oxide material, and about 0% to about 40% by weight refractory filler, based on the total weight of slurry A. The second part is slurry B, comprising slurry A, along with the remaining portion of the liquid carrier; and an additional amount of refractory filler. The total amount of refractory filler in the overall slurry composition is as described below. Portions of slurry A and slurry B can be applied to the protective coating surface in layers, to eventually form the overcoat, as also described below.

Slurry coatings based on the present invention may be applied to the protective coating surface by a variety of techniques known in the art. (See, for example, the Kirk-Othmer *Encyclopedia of Chemical Technology*, 4th Edition, Vol. 5, pp. 606–619; as well as the *Technology of Paints, Varnishes and Lacquers*, Edited by C. Martens, Reinhold Book Corporation 1968. Both of these texts are incorporated herein by reference). They can be slip-cast, brushed-painted, dipped, sprayed, flow-coated, roll-coated, or spun-coated onto the substrate surface, for example.

Spraying (e.g., air spraying or airless spraying) is often the easiest way to apply the slurry coating onto the protective coating. The viscosity of the coating for spraying can be frequently adjusted by varying the amount of liquid carrier used, for example. Spraying equipment and parameters for this technique are known in the art, e.g., see the *Encyclopedia of Chemical Processing and Design*, Vol. 53, p. 45 et seq.; and *Surface Coatings—Paints and their Applications*, Vol. 2, Tafe Educational Books, 1984. One example of an air-spray gun is the Paasche 62 sprayer, which operates at about 35–40 psi, and forms a 1–2 inch (2.5–5.1 cm) spray-fan pattern, when the spray gun is kept at about 5–12 inches (12–30 cm) from the substrate (stand-off distance). A wide variety of paint sprayers can be used.

The protective coating is usually maintained at a temperature in the range of about 20° C. to about 120° C., prior to application of the slurry coating. In some instances, the protective coating is maintained at a temperature in the range of about 40° C. to about 60° C. This "pre-heating" appears to accelerate the drying process, and minimizes the occurrence of any mud-cracking which would result from the presence of trapped volatile material. The pre-heating also reduces the tendency of the applied slurry to "run" on the protective coating surface.

Usually, the slurry composition is applied to the protective coating in multiple passes, i.e., by applying a series of layers, with a heat treatment usually being carried out after the deposition of each layer. This allows for adequate, intermediate curing of each layer, and helps to prevent the occurrence of large mud-cracks. The appropriate time/temperature schedule for heating each layer will depend on various factors, but it is frequently about 5 minutes to about 60 minutes, at a temperature in the range of about 50° C. to about 150° C. If the temperature is too high for a given volatile material, its quick evaporation can lead to bubbling, which may result in coating defects. The volatility of components in the slurry composition can be determined by a variety of techniques, such as differential thermal analysis (DTA) and thermal gravimetric analysis (TGA).

In some preferred embodiments, one or more of the applied layers of slurry material is polished or ground after being deposited. This step is useful in decreasing the roughness of the applied layer, and in removing excess slurry material from the particular coating surface. The polishing or grinding is usually very light, e.g., less than about 5 psi, and often, less than about 3 psi. It can be carried out, for example, by hand-polishing, or by the use of an abrasive wheel which would typically be employed for brushing, buffing, or finishing operations. Examples of common polishing materials are alumina, silicon carbide, diamond, or polymer fiber-based materials, e.g., some of the Scotch-brite™ products. (Various polishing techniques are described, for example, in the Kirk-Othmer *Encyclopedia of Chemical Technology*, 3rd Edition, V. 1, page 26 et seq., which is incorporated herein by reference).

In broad terms, grinding or polishing would be carried out for a period of time which is about 5% to about 20% of the time typically used to grind or polish a plasma-applied protective coating surface (e.g., a zirconia-based TBC), although the exact time will depend on various factors, such as the pressure applied to the coating surface and the type of polishing or grinding media. Polishing or grinding of the applied layers is especially advantageous when the overall coating is being used to fill in cracks and pits located within the surface of the protective coating.

In some embodiments, the composition of each layer of the slurry/gel coating (including the first layer) is substantially identical, i.e., in terms of the amount of refractory filler material, oxide matrix precursors, and other optional ingredients. However, in other embodiments, the first layer applied, sometimes referred to herein as the "base layer", contains a significantly smaller amount of refractory filler than upper layers or "topcoats" which are subsequently applied. It appears that using a lower amount of the refractory filler (or even having no refractory filler) in the base layer results in a final overcoat which is more uniform, adherent, and smoother. Thus, the base layer is usually formed of a composition similar to slurry A, as described above.

Each "topcoat" usually contains a larger amount of the refractory material than that which is in the base layer. (As used herein, the term "topcoat" refers to the layers applied above the base layer, except for the finish-coat, which is described below). Each topcoat is usually similar to the composition of slurry B, described above. It is not necessary that the composition of each topcoat be identical to another topcoat, although obtaining the topcoat material from a single source can simplify the process. However, it would also be possible to vary the composition of each topcoat, so as to gradually increase the amount of refractory material that is present in each coating pass, i.e., forming a "graded" topcoat system. For example, for a final coating formed with 4 to 8 topcoats, each successive topcoat could contain about 5% to about 15% more of the refractory filler (e.g., zirconia) than the previous topcoat, with the proviso that the final amount of refractory filler be within the ranges described herein.

In some preferred embodiments, a "finish-coat" is applied over the last topcoat. The finish-coat has a composition which is similar or identical to that of slurry A, and further enhances surface smoothness. The finish-coat can be applied by the same techniques used to apply the other coatings.

One embodiment for smoothing the surface of a ceramic-based protective coating comprises the following steps:

(a) applying a base layer of a slurry composition which comprises the refractory filler and precursors of the porous oxide matrix, wherein the refractory filler is present at about 0% to about 40% by weight, based on the weight of the base layer composition;

(b) heat-treating the applied base layer according to a temperature/time schedule sufficient to remove substantially all volatile material in the base composition while preventing excessive bubbling;

(c) applying at least one slurry topcoat on top of the base layer to form an overcoat, wherein the topcoat is formed of a composition comprising the refractory filler and the porous oxide matrix precursors, and wherein the refractory filler is present at about 25% to about 99% by weight, based on the total weight of the topcoat; and then (d) heat-treating the overcoat, according to a temperature/time schedule sufficient to cure the overcoat.

In some preferred embodiments, at least one of the topcoats (and sometimes all of them) is heat-treated after being applied, according to a temperature/time schedule sufficient to remove substantially all volatile material in the topcoat while preventing excessive bubbling in the coating.

The number of slurry topcoats will be determined by various factors, such as the required thickness for the overall coating; the particular rheological characteristics for the coating composition; the evaporation rates for the volatile components in the composition, and the shrinkage rate of the coating as the volatile components evaporate. When the slurry composition is being used to smooth a rough protective coating (e.g., a plasma-deposited zirconia-based TBC), the number of topcoats will also depend in part on the degree of roughness. For a TBC with an as-applied Ra of about 12–25 microns, the number of topcoats of a zirconia/oxide matrix precursor system will usually range from about 2 to about 10.

When the slurry composition is being used to fill in cracks and pits which are sometimes formed in protective coating surfaces (as-deposited or after grinding), the number of topcoats will depend in part on the depth of the pits and cracks. For a TBC which has pits and cracks with a depth in the range of about 125 microns to about 1000 microns, the number of topcoats of a zirconia/oxide matrix precursor system will usually range from about 4 to about 20.

The thickness of each topcoat (as applied) will usually be in the range of about 0.1 mil to about 2 mils (about 2.5 microns to about 50 microns) and preferably in the range of about 0.5 mil to about 1.5 mils (about 13 microns to about 38 microns). The thickness of the base layer will usually be in the range of about 0.1 mil to about 2 mils (about 2.5 microns to about 50 microns), and preferably in the range of about 0.25 mil to about 1 mil (about 6 microns to about 25 microns). The optional finish-coat often has the same, approximate thickness ranges as those described for the base layer.

In some embodiments of this invention, each topcoat in step (c) does not have to include the refractory filler. As an illustration, several of the topcoats could be based on the oxide matrix-forming material by itself, or with any of the additives discussed above. However, in preferred embodiments, the composition of each topcoat does include the refractory filler.

The heat treatment of the base layer and each topcoat can be carried out by a variety of techniques, such as oven-drying, and/or using one or more standard heat lamps (preferably having an output of between about 200 watts and 1000 watts). One advantage of the heat lamps is their portability when repairing coatings at remote locations. For step (d), curing of the overcoat is accomplished when (1) any organic materials are substantially evaporated or "burned out"; and (2) the overcoat becomes densified and/or the matrix becomes crystallized. Usually, the time/temperature schedule is about 1 minute to about 120 minutes, at about 400° C. to about 1200° C. In preferred embodiments, the heat treatment temperature is in the range of about 400° C. to about 800° C., for about 5 minutes to about 60 minutes.

In preferred embodiments, the heat treatment temperature for step (b) is usually in the range of about 60° C. to about 100° C., and the duration of heat treatment is usually in the range of about 15 minutes to about 30 minutes. When one or more of the topcoats is optionally heat-treated, the temperature is usually in the range of about 60° C. to about 100° C., and the duration of heat treatment is usually in the range of about 10 minutes to about 30 minutes.

Furthermore, all of the heat treatments described above can sometimes be followed by a relatively rapid, high-heat treatment, e.g., using a torch or high-wattage lamps (e.g., about 1500–2500 Watts) which produce a temperature in the range of about 350° C. to about 1000° C. This high-heat temperature treatment is usually carried out for about 30 seconds to about 2 minutes. Alternatively, when the underlying substrate is a section of a gas turbine engine, the high-heat treatment can be carried out by firing the engine. Regardless of how the heat treatments are carried out, their adequacy can be determined in part by examination of the coatings after they are cooled, in regard to appearance, adhesion, and other physical tests described below.

Some of the other details regarding the deposition of multiple layers of the slurry coating can be found in the above-referenced U.S. Pat. No. 5,759,932. Variations in deposition techniques are disclosed there also, e.g., gradually heating the base layer and topcoats after they are deposited.

It should be understood, however, that some embodiments of the present invention do not require any type of topcoat. In other words, the overcoat would primarily comprise a slurry base layer, as described previously, containing a selected amount of refractory filler. As an illustration, the topcoat (or topcoats) might not be necessary when the surface roughness of the protective coating is very fine.

As described previously, each layer of slurry material can be polished (or ground), before and/or after any associated heat treatment of the layer. (The base layer is usually not polished, although the finish-coat can be polished). Polishing or grinding after the final heat-treatment (curing) of the overcoat can be carried out to remove substantially all of the overcoat from the "planar" surface of the protective coating, so that the overcoat material only remains in any pits, valleys, cracks, or crevices within the protective coating surface. In such a procedure, the polishing/grinding conditions (e.g., time, applied pressure, size of the abrasive particles, and the like) are sufficient to remove all of the above-surface overcoat material, without substantially removing or damaging any of the protective coating material. (The same procedure could be used for curved surfaces which contained these irregularities. In other words, all of the overcoat material would again be removed from the "summits" of the curved surface, leaving the overcoat material in any concavities or cracks within the surface.)

At least several advantages are associated with this method of polishing the overcoat material (regardless of whether it is formed from a slurry or a gel, the latter being discussed below). First, smoothening of the exposed slurry/gel surface by polishing usually occurs more quickly, as compared to polishing the protective coating material itself, because the cured slurry/gel can be polished with relative ease. Second, a helpful indicator of how long polishing should be carried out is obtained with this procedure. For example, when polishing abruptly becomes more difficult, it would be readily apparent that the underlying, relatively hard protective coating material (e.g., a zirconia-based TBC) has been uncovered. Polishing would then be terminated, if desired.

As mentioned previously, the overcoat which is applied to the surface of the protective coating can, alternatively, be in the form of a gel. Gels and sol-gels are known in the art and described, for example, in *Sol-Gel Science,* by C. Brinker et al, Academic Press, Inc., 1990; and *Inorganic Materials Chemistry,* by D. Sangeeta, CRC Press, 1997; in the *Kirk-Othmer Encyclopedia of Chemical Technology,* 3rd Edition, Vol. 2, p. 219 et seq (1978), and 4th Edition, Vol. 5 (and in citations in that volume); as well as in *Ullmann's Encyclopedia of Industrial Chemistry,* Fifth Edition; Volume A14, VCH Publisher (1989), and the above-referenced U.S. Pat. No. 5,759,932. All of the above texts are incorporated herein by reference.

The gel will often have a composition similar (but not necessarily identical) to that used for a slurry composition, e.g., some form of zirconia combined with oxide matrix precursors like alumina and silica. As described in the Sangeeta text, gels can be prepared from a variety of molecular precursors, which may be inorganic or organic. Examples of inorganic salts which can be used to form gels are metal halides, metal carbonates, metal sulfates, metal nitrates, metal hydroxides, and salts with mixed ligands, such as $(C_2H_5)_3SiCl$. Examples of metal organic compounds (MOCs) which can be useful for gels are covalent or inorganic coordinate compounds where the metal center is bonded to the ligand via a non-carbon atom, such as oxygen, sulfur, phosphorus, or nitrogen. Specific examples include metal alkoxides (e.g., $Al(OC_3H_7)_3$; metal carboxylates (e.g., $Al(OC(O)CH_3)_3$); metal ketonates; metal amides; metal thiolates; metal azides; metal thiocyanides; and MOCs with mixed functional groups.

Organometallic compounds may also be used to form gels. These materials are usually covalent or coordinate compounds in which the ligand is bonded to the metal center via a carbon atom. Examples of these compounds are metal alkyls, metal aryls, metal alkenyls, metal alkynyls, metal carbonyls, and materials containing mixed organometallic ligands, like phenylacetylnyl compounds.

In some situations, polymeric precursors can also be used as starting materials for sol-gels. Non-limiting examples include polycarbosilanes, polysilizanes, polysiloxanes, polysilanes, borazines, carboranes, phophasphazenes, polystannoxanes, and polygermanes.

The selection of precursors will depend in large part on the desired composition of the overcoat, i.e., its matrix and refractory filler, along with any other components. In some preferred embodiments in which the overcoat is applied on a thermal barrier coating, the gels may be formed from precursors of zirconium alkoxides, yttrium alkoxides, silicones, or silicon alkoxides. Other organo-metallic precursors of zirconium, yttrium, silicon, and the like, could also be employed.

There are a variety of techniques available to prepare gels. Many of them are described in the various references set out above. As one example, some types of coating ingredients (or their precursors) can be mixed in an aqueous or organic solution. A pre-selected variation in the pH of the solution can cause supersaturation and rapid precipitation of the gel-forming material. The precipitated particles usually are of colloidal size (but do not have to be that size), and have a low crystalline order. Colloidal substances like colloidal alumina are hydrophilic. In concentrated colloidal suspensions, these substances readily coagulate into gels.

As another example, the Brinker text describes methods of making gels from suspensions of particles made by flame oxidation. In general, those skilled in the art will be able to readily select the most appropriate preparation technique for a given situation. Gel-type materials are commercially available under the trade names Ludox® and Stober®.

The gels can be applied by any of the techniques described above, e.g., spraying, flow-coating, dip-coating, spin-coating, and the like. (As known in the art, techniques are available to tailor a liquid-like, gel-forming composition, so that complete formation of the gel does not occur until the composition is applied to a surface. Until that time, the composition can sometimes be more easily handled in liquid form).

Moreover, the gels could be applied in multiple layers, as described for slurries. The number of layers and their thickness, as well as any associated heat treatments, will depend in part on the composition of the gel (e.g., its volatile content) and its flow characteristics, as well as the underlying coating characteristics mentioned above (e.g., the roughness of a TBC). Grinding or polishing steps after applying the gel layers can be carried out as described previously, taking into account the particular characteristics of the gel composition.

One useful application of the present invention involves finishing operations for the protective coatings. For example, a rough coating like a plasma-applied TBC could first be polished by conventional techniques to provide a surface with some level of decreased roughness, i.e., partially smoothened. The surface could then be further smoothened by applying and heating the slurry/gel coating, as described above, along with the optional polishing or fine grinding steps associated with the slurry/gel process. Such a technique usually requires less time than that which is required if the conventional polishing technique is used throughout. Moreover, the protective coating is provided with acceptable smoothness, while substantially eliminating the defects which often result from the extensive use of heavy polishing or grinding operations.

It should be apparent from the description provided above that another embodiment of the present invention is directed to an article, which comprises the following components:

(I) a metal-based substrate;

(II) a protective coating applied over the substrate; and (III) a cured, ceramic-based slurry/gel coating (i.e., an overcoat) over the surface of the protective coating.

The substrate can be any metallic material or alloy which is typically covered by a protective coating. Often, the substrate is a heat-resistant alloy, e.g., a superalloy. Nickel-based superalloys are exemplary. Such materials are described in various references, such as U.S. Pat. Nos. 5,759,932; 5,399,313; and 4,116,723, all incorporated herein by reference. High temperature alloys are also generally described in Kirk-Othmer's *Encyclopedia of chemical Technology*, 3rd Edition, Vol. 12, pp. 417–479 (1980), and Vol. 15, pp. 787–800 (1981).

As described previously, the protective coating is sometimes a zirconia-based thermal barrier coating which has been plasma-sprayed (e.g., by APS) onto a bond-coated superalloy substrate. (In the case of TBC's, the bond coat is frequently formed from a material like MCrAlY, where "M" represents a metal like iron, nickel, or cobalt.). The surface of such a TBC usually exhibits considerable roughness.

Component (III) is a cured slurry or gel layer which is based on a refractory filler like zirconia, contained within an oxide matrix. The slurry/gel is often applied in multiple layers, as described previously. When heat-cured, the slurry/gel layer (overcoat) adheres tightly to the underlying TBC, and provides a relatively smooth surface, e.g., an Ra of less than about 7 microns, and preferably, less than about 3 microns. The refractory filler is usually present at about 20% to about 70% by volume, based on the total volume of the slurry/gel coating.

The following examples are provided for illustration, and should not be considered to be any type of limitation on the scope of the present invention.

EXAMPLE 1

Button-shaped specimens were made from a nickel-based superalloy. The buttons each had a diameter of 1 inch (2.5 cm), and a thickness of 0.125 inch (0.32 cm). A commercially-available Sulzer-METCO spray gun system was used to deposit the bond coating and TBC onto a surface of the button by air plasma spraying. Prior to deposition of the bond coat, each button was grit-blasted (60 grit), and then ultrasonically cleaned with an alcohol and acetone. A bond coat of the NiCrAlY-type was then applied to the button, using an air plasma system. The thickness of the bond coat was about 250 microns. The thermal barrier coating (zirconia, with 8 wt. % by weight yttria), having an average thickness of about 500 microns, was then air plasma-sprayed onto the bond coat. The degree of roughness (Ra) of the TBC, as-deposited, is shown in Table 1. (Such a surface is characterized by peaks and valleys having a varying topography). The Ra value after deposition of the slurry/gel coating is also set forth in the table.

The coating composition for samples 1–3 was a slurry coating, based on a dry silicone binder with a silicon-oxygen backbone. The composition was as follows (the ingredients were added to a Nalgene bottle in the order listed below):

15 g ethanol (EtOH)

7 g SR-350 silicone resin 5 g of UCON lubricant.

The silicone resin, SR-350, is available from GE Silicones. It is based on a dry silicone binder with a silicon-oxygen backbone, which retains 80% of its weight when heated to about 900° C. The lubricant (UCON-50MB-2000) is a polyalkylene glycol monobutyl ether material available from Union Carbide. The ingredients were mixed thoroughly, and the resulting mixture was homogenous and translucent.

22.5 g of SM8 submicron alumina was then added, followed by mixing on the paint shaker for 35–40 minutes. Then, 17.25 g of YSZ spheres (spheres made from zirconia and 7% by weight yttria; approximately 20–50% of them were hollow) were added, followed by mixing for a time period sufficient to provide a well-suspended slurry (i.e., hand-mixing for about 10–20 minutes, or ultrasonic agitation for about 1–10 minutes). The resulting composition (which contained aluminosilicate matrix precursors and zirconia) was designated "Slurry A", and was fluid-like (i.e., low viscosity) and white in color.

Subsequently, "Slurry B" was prepared by hand-mixing the following ingredients in the given order:

10 g of ethanol;

10 g of YSZ spheres (same as above); and 10 g of Slurry A.

For each of samples 1–3, one base layer of slurry A was sprayed onto the surface of the TBC, using a conventional paint sprayer which operated at about 30–40 psi. The TBC surface was maintained at a temperature of about 35° C. to about 110° C. during deposition. The "wet" thickness of the layer was sufficient to provide a cured thickness of about 12 microns. After being deposited, this first layer was heated in a convection oven at about 80° C. for about 15 minutes, to remove a substantial portion of the volatile material.

Three or four layers (depending on the particular sample) of slurry B were then applied over the layer of slurry A. After being deposited, each of the slurry B layers was heated at about 80° C. for about 15 minutes, as in the case of the base layer. Each of the slurry B layers had a thickness, as-cured, of about 12–25 microns. After the final slurry B layer was applied, the multi-layer coating system was cured at 1100° C. for 1 hour. The samples were then polished on a 6 micron- and a 1 micron-abrasive disc.

Surface roughness was measured by way of stylus profilometry. The measurements were taken, three times each, in orthogonal directions, on different sections of the button surface, and were then averaged. The table which follows Example 2 displays results for these samples.

EXAMPLE 2

Button-shaped specimens like those used in Example 1 were employed here. A bond coating and TBC were again air plasma-sprayed onto the buttons. The zirconia/yttria TBC had an average thickness of about 500 microns, and a degree of roughness (Ra) shown in Table 1. (The Ra value after deposition, curing, and polishing of the slurry/gel coating is also set forth in the table.)

The coating composition for these samples was a slurry coating (i.e., Slurry A/Slurry B), based on zirconia spheres and a dry silicone binder with a silicon-oxygen backbone, as described in Example 1.

For each of samples 4–5, one base layer of slurry A was sprayed onto the surface of the TBC, using a conventional paint sprayer which operated at about 30–40 psi. The TBC was maintained at room temperature during deposition of the base layer. The "wet" thickness of the layer was sufficient to provide a cured thickness of about 12–25 microns. After being deposited, this first layer was heated in a convection oven at about 80° C. for about 15 minutes, to remove a substantial portion of the volatile material.

Three layers of slurry B were then applied over the layer of slurry A. After being deposited, each of the slurry B layers was heated at 80° C. for about 15 minutes, as in the case of the base layer. Each of the slurry B layers had a thickness, as-cured, of about 12–25 microns. After the final slurry B layer was applied, the multi-layer coating system was cured at 1100° C. for 1 hour. The samples were then polished on a 6 micron and a 1 micron-abrasive disc.

Surface roughness was measured as described in the first example. The table displays results for these samples.

TABLE

| Sample No. | Coating Comp.* | #of Layers | Ra before SF** | Ra after SF** |
|---|---|---|---|---|
| 1–3 | Slurry A/ Slurry B[a] | 3–4[c] | 14–17 $\mu$m | 6–8 $\mu$m[e] |
| 4 | Slurry A/ Slurry B[b] | 4[d] | 20 $\mu$m | 2.5 $\mu$m[e] |
| 5 | Slurry A/ Slurry B[b] Slurry A/ Slurry B[b] | 4[d] | 12 $\mu$m | 2.0 $\mu$m[e] |

*Coating composition
**Ra roughness before Surface Finishing; and after Surface Finishing (i.e., deposition of slurry coatings, heating, polishing, as described above).
[a]Yttrium-stabilized zirconia spheres/aluminosilicate matrix, as described previously. (Substrate was YSZ TBC).
[b]Yttrium-stabilized zirconia spheres/aluminosilicate matrix, as described previously. (Substrate was YSZ TBC).
[c]Deposited on a TBC layer heated on a temperature of 40–60° C.
[d]Deposited on a TBC layer heated on a temperature of 22–28° C.
[e]Ra value after polishing for 30 secs with a 6-micron abrasive wheel, and 30 seconds with a 1-micron abrasive wheel.

(a) Yttrium-stabilized zirconia spheres/aluminosilicate matrix, as described previously. (Substrate was YSZ TBC).

(b) Yttrium-stabilized zirconia spheres/aluminosilicate matrix, as described previously. (Substrate was YSZ TBC).

(c) Deposit ed on a TBC layer heated to a temperature of 40–60° C.

(d) Deposited on a TBC layer heated to a temperature of 22–28° C.

(e) Ra value after polishing for 30 secs with a 6-micron abrasive wheel, and 30 seconds with a 1-micron abrasive wheel.

Samples 1–3 were smoothened to some degree by the process of this invention, although some peaks and valleys remained in the TBC surface after polishing. The indicated composition and process would be useful for some embodiments in which a very high degree of smoothness was not required.

Samples 4 and 5 exhibited a very smooth surface finish after light polishing. The technique and compositions associated with these samples would be very useful for the surface-finishing of TBC's used on airfoil components of turbine engines.

Figure 1:
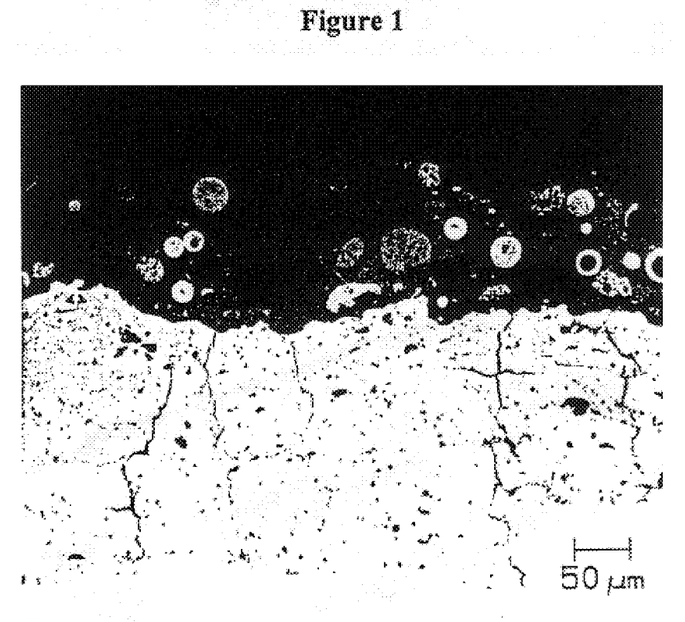
FIG. 1 is a photomicrograph of a cross-section of a slurry coating applied to a thermal barrier coating according to the present invention.

FIG. 1 is a photomicrograph depicting a cross-section of a coated sample, at a magnification of 200×. The whiter, lower section of the figure is a cured YSZ-type thermal barrier coating (TBC) which had been air plasma-sprayed over a nickel-based superalloy substrate (a NiCrAlY-type bond coat was applied before deposition of the TBC). The roughness of the as-deposited TBC is shown at the interface of the lighter and darker sections of the micrograph.

According to the present invention, an aluminosilicate/zirconia/yttria-based slurry layer (the darker section of the figure) has been sprayed over the TBC. As in the case of Example 2, a base layer of slurry A was sprayed onto the surface of the TBC, followed by the spraying of three layers of slurry B. Each of the slurry B layers was heated at about 100° C. for about 15 minutes. After the last slurry B coating was applied, polishing was undertaken for 30 seconds with a 6-micron abrasive wheel, and 30 seconds with a 1-micron abrasive wheel. An additional slurry A coating was then sprayed on top of the polished slurry B coating, and heat-treated at about 100° C. The dried slurry A coating was then polished like the previous layer. The overcoat was then heat-treated at about 900° C. for 1 hour.

The zirconia spheres within the slurry coating (i.e., the overcoat) are quite visible in FIG. 1. The slurry coating provides a considerable amount of smoothness to the as-deposited TBC.

Figure 2:
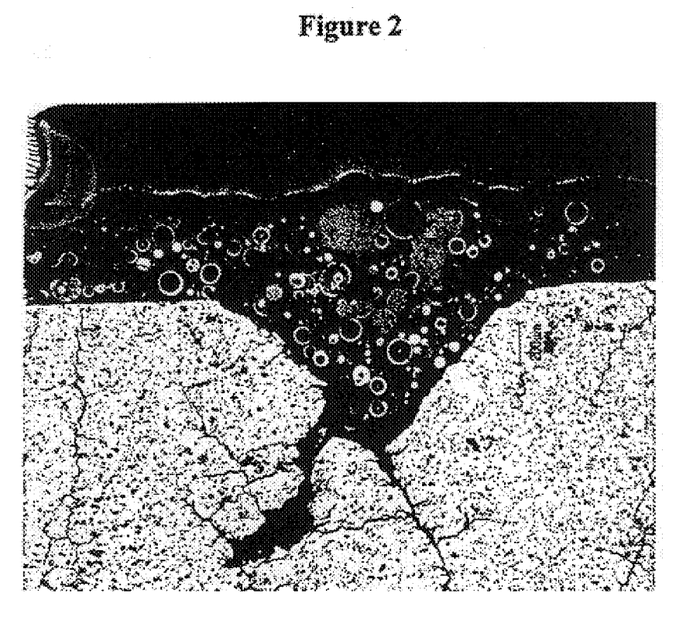
FIG. 2 is photomicrograph of a slurry coating applied to a thermal barrier coating which contains a pull-out cavity, according to the present invention.

FIG. 2 is another photomicrograph depicting a cross-section of a coated TBC sample. The substrate, bond coat, and TBC had compositions identical to the sample depicted in FIG. 1. A cavity is present in the substrate, and occurred due to a "pull-out", i.e., the unintended removal of a particle of TBC material during a polishing operation.

The cavity has been effectively filled by brushing multiple layers of aluminosilicate/zirconia/yttria-based slurry material onto the surface of the TBC. The slurry layer was cured at 420° C. after being deposited. The slurry layer bonds very tightly to the TBC, and exhibits heat-resistance properties substantially identical to the TBC, while also providing a high level of smoothness to the protective coating.

While preferred embodiments have been set forth for the purpose of illustration, the foregoing description should not be deemed to be a limitation on the scope of the invention. As an example, various other types of protective coatings could be smoothened according to the present invention, e.g., oxidation-resistant coatings, corrosion-resistant coatings, or abrasion-resistant coatings. In fact, the method of the present invention can be used to smooth any ceramic-based coating which initially exhibits roughness. Moreover, various other modifications, adaptations, and alternatives may occur to one skilled in the art without departing from the spirit and scope of the claimed inventive concept.

All of the patents, articles, and texts mentioned above are incorporated herein by reference.

What is claimed:

1. An article, comprising:
   (I) a metal-based substrate;
   (II) a ceramic-based protective coating applied over the substrate; and
   (III) a ceramic-based slurry/gel overcoat over the surface of the protective coating.

2. The article of claim 1, wherein component (III) comprises at least two slurry/gel coatings which have been applied consecutively.

3. The article of claim 1, wherein component (III) comprises zirconia and precursors of an oxide matrix.

4. The article of claim 3, wherein the precursors of the oxide matrix comprise alumina and a silica source.

5. The article of claim 4, wherein the precursors of the oxide matrix further comprise a liquid carrier.

6. An article comprising:
(I) a metal-based substrate;
(II) a ceramic-based protective coating applied over the substrate; and
(III) a cured, ceramic-based slurry/gel coating over the surface of the protective coating.

7. The article of claim 6, wherein component (III) comprises a refractory filler contained within an oxide matrix.

8. The article of claim 6, wherein the metal-based substrate is a superalloy.

9. The article of claim 6, wherein a bond coat is disposed between the substrate and component (II).

10. The article of claim 6, wherein the protective coating surface comprises peaks and valleys, and substantially all of the cured slurry/gel coating is present in the valleys.

11. The article of claim 6, wherein the protective coating is a zirconia-based thermal barrier coating.

12. The article of 11, wherein the thermal barrier coating has been applied by plasma-spraying.

13. The article of claim 11, exhibiting a surface roughness (Ra) of less than about 7 microns.

14. An article, comprising:
(I) a superalloy-based substrate;
(II) a zirconia-based thermal barrier coating applied over the substrate; and
(III) a cured, ceramic-based slurry/gel overcoat over the surface of the thermal barrier coating.

15. The article of claim 14, wherein the overcoat comprises a zirconia-based refractory filler and an oxide matrix which is selected from the group consisting of alumina, aluminosilicate, and mixtures of alumina and aluminosilicate.

16. The article of claim 14, wherein the superalloy substrate is a component of a turbine engine.

* * * * *